United States Patent
Rosen et al.

(10) Patent No.: US 9,502,141 B2
(45) Date of Patent: Nov. 22, 2016

(54) SURFACE SEDIMENT CORE CATCHER

(71) Applicants: Gunther H. Rosen, San Diego, CA (US); David Bart Chadwick, San Diego, CA (US); Brittney Nguyen, San Diego, CA (US); Hoa G Nguyen, San Diego, CA (US); Aaron B. Burmeister, La Mesa, CA (US)

(72) Inventors: Gunther H. Rosen, San Diego, CA (US); David Bart Chadwick, San Diego, CA (US); Brittney Nguyen, San Diego, CA (US); Hoa G Nguyen, San Diego, CA (US); Aaron B. Burmeister, La Mesa, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 505 days.

(21) Appl. No.: 14/197,493

(22) Filed: Mar. 5, 2014

(65) Prior Publication Data

US 2015/0255179 A1 Sep. 10, 2015

(51) Int. Cl.
*E21B 25/00* (2006.01)
*G21C 9/016* (2006.01)

(52) U.S. Cl.
CPC .............. *G21C 9/016* (2013.01); *Y02E 30/40* (2013.01)

(58) Field of Classification Search
CPC ........ E21B 25/00; E21B 25/06; E21B 25/08; E21B 25/10; E21B 25/14
USPC ......................................... 175/249
See application file for complete search history.

(56) References Cited

U.S. PATENT DOCUMENTS

| 3,874,465 A * | 4/1975 | Young ................... E21B 25/02 175/236 |
| 2005/0133267 A1 * | 6/2005 | Reid, Jr. ................ E21B 49/06 175/58 |

OTHER PUBLICATIONS

AMS; Sludge and Sediment Samplers; Product Information Page; accessed on Dec. 31, 2013, available online at http://www.ams-samplers.com/itemgroup.cfm?CNum=74&catCNum=10.
SONIX; Sonic Tool; Product Catalog; p. 17, available online by at least Nov. 6, 2013; available online at http://www.holeproducts.com/category/Sonic-Drilling-Tools.
PVL Technologies; Product Information Page; accessed on Jan. 9, 2014; available online at http://www.pvltech.com/core-tubes-catchers-and-noses.html.
David P. Huey; IODP Drilling and Coring Technology—Past and Present—; Final Report Presented to IODP-MI; Sep. 2009; section 4.2.

* cited by examiner

*Primary Examiner* — Taras P Bemko
(74) *Attorney, Agent, or Firm* — SPAWAR Systems Center Pacific; Kyle Eppele; J. Eric Anderson

(57) ABSTRACT

A core catcher comprising: a cap configured to be secured to a first end of a core liner such that when the first end of the core liner is inserted into sediment a sample sediment core enters the core liner through the cap; a cross-beam coupled to the cap and mounted across the first end of the core liner such that a cross-section of the first end of the core liner is divided into two openings; a flexible member secured to the cross-beam such that the flexible member, the cross-beam, and the cap form a dual-flap valve designed to allow the sediment core to enter the core liner through the two openings and to prevent the sediment core from escaping the core liner through the cap.

18 Claims, 6 Drawing Sheets

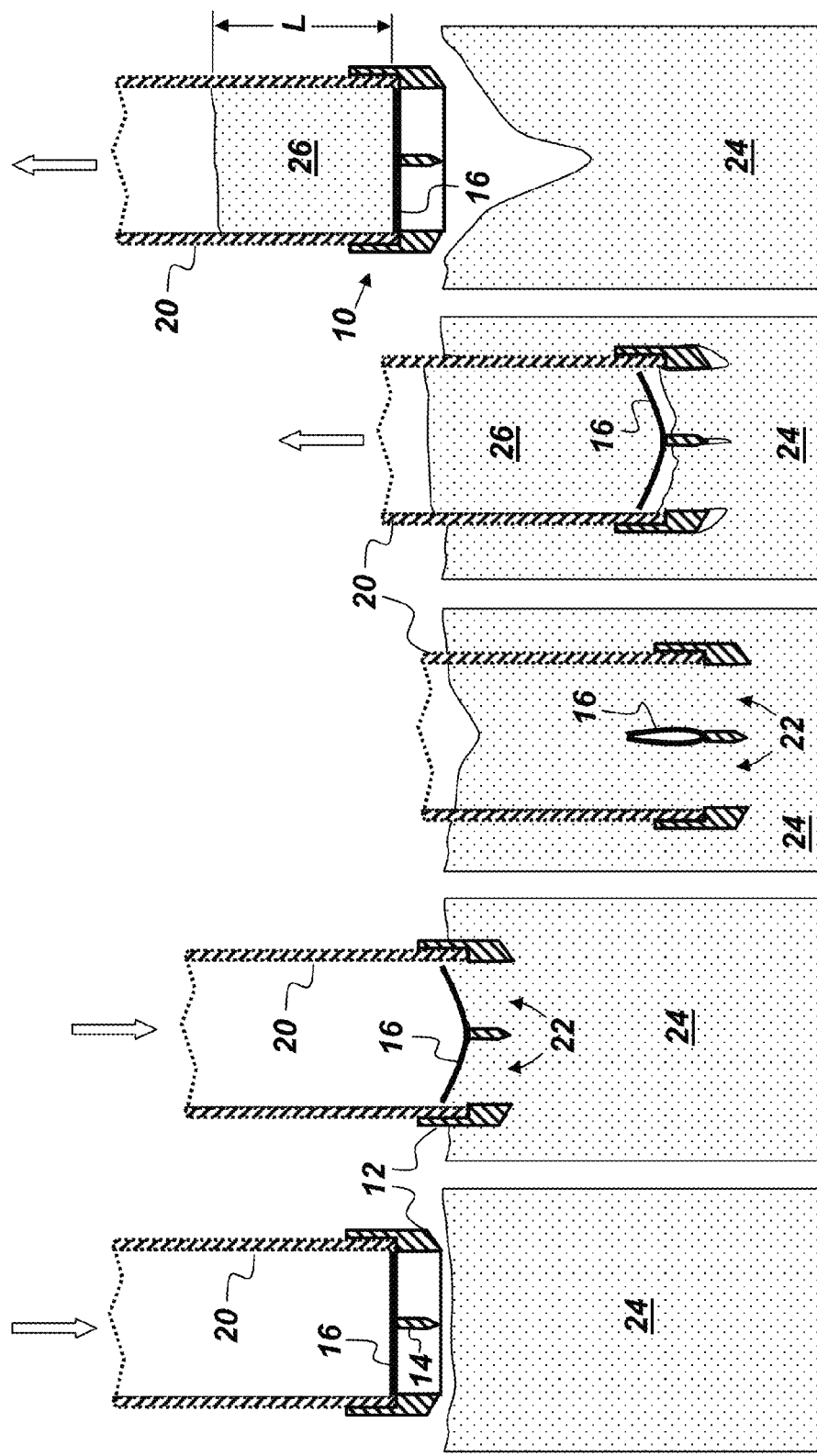

SURFACE SEDIMENT CORE CATCHER

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102059.

BACKGROUND OF THE INVENTION

There are many types of core catchers in use today. Some core catchers are integrated into core sampling technologies, and require active energy-powered movement to work. These active core catcher designs can also be very bulky, difficult to manufacture because of their many moving parts, and expensive. Because of their integration with the sampling technologies, they cannot function independently. For example, a sphincter-type core catcher is rotated closed by the final movement of a piston in a piston core sampler. Many passive core catchers also exist, the majority of them functioning using variations of stiff, yet flexible, fingerlike projections that are arranged in a dome shape and may normally be closed, but are pushed open by incoming sediment. One such core catcher resembles an eggshell, is made of hard plastic, has gaps in between the fingers, and has a small opening at the apex, which allows water to drain out during recovery. This "eggshell" design is not suitable for soupy, finer sediment types, as the sediment, or target organisms, can escape through the gaps or the hole in the apex. There are other passive designs that provide more complete closure but they have many moving parts, which are subject to jamming, and are made of metal, which bends easily and is non-inert.

SUMMARY

Described herein is a core catcher comprising: a cap, a cross beam, and a flexible member. The cap is configured to be secured to a first end of a core liner such that when the first end of the core liner is inserted into sediment a sample sediment core enters the core liner through the cap. The cross-beam is coupled to the cap and mounted across the first end of the core liner such that a cross-section of the first end of the core liner is divided into two openings. The flexible member is secured to the cross-beam such that the flexible member, the cross-beam, and the cap form a dual-flap valve designed to allow the sediment core to enter the core liner through the two openings and to prevent the sediment core from escaping the core liner through the cap.

The core catcher may also be described as comprising a cap, a cross-beam, and a nonmetallic, flexible member. The cap is configured to be secured to a first end of a core liner such that when the first end of the core liner is inserted into loose ocean sediment a sample sediment core enters the core liner through the cap. The cross-beam is coupled to the cap and mounted across the first end of the core liner such that a cross-section of the first end of the core liner is divided into two openings. The nonmetallic, flexible member is secured to the cross-beam such that the flexible member, the cross-beam, and the cap form a dual-flap valve designed to allow the sediment core to enter the core liner through the two openings and to prevent the sediment core, any benthic organisms present in the sediment core, and a majority of any liquid in the sediment core from escaping the core liner through the cap.

BRIEF DESCRIPTION OF THE DRAWINGS

Throughout the several views, like elements are referenced using like references. The elements in the figures are not drawn to scale and some dimensions are exaggerated for clarity.

FIGS. 2A through 2E are a series of cross-sectional, side-view illustrations of an embodiment of a core catcher descending into, and being removed from, surface sediment.

DETAILED DESCRIPTION OF EMBODIMENTS

Figure 1A:
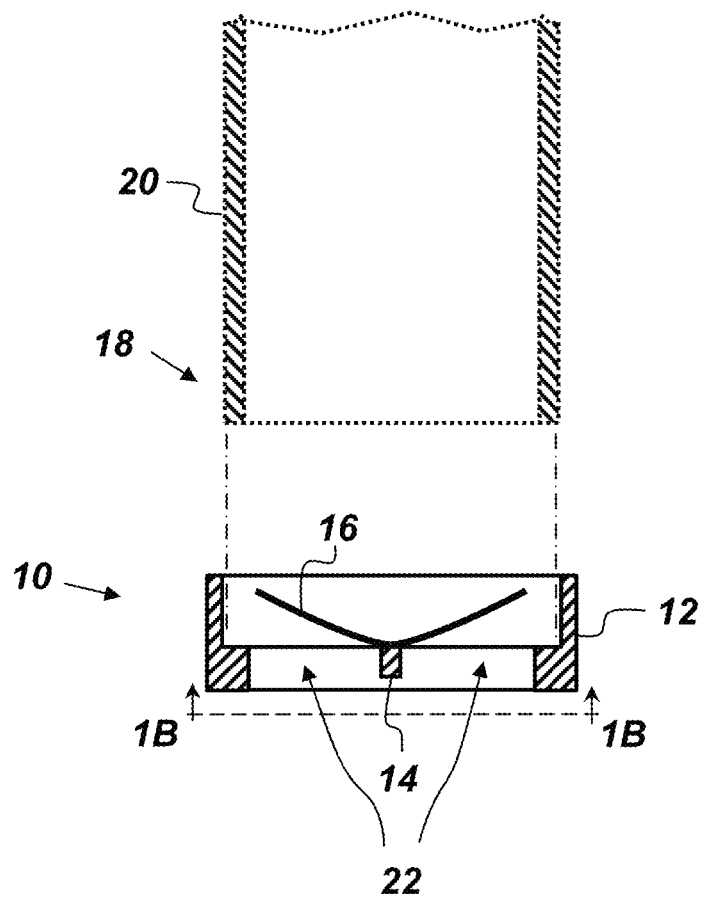
FIG. 1A is a cross-sectional, side view of an embodiment of a core catcher.
Figure 1B:
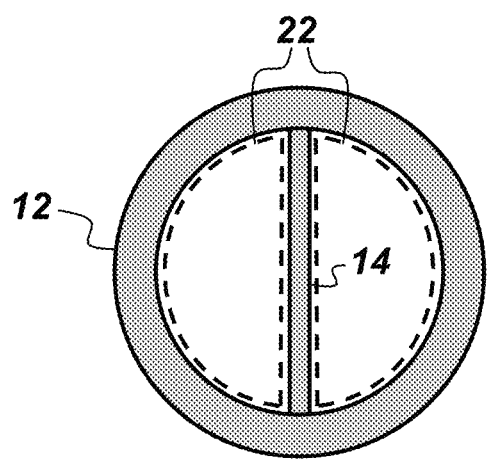
FIG. 1B is a bottom view of an embodiment of a core catcher.

FIGS. 1A and 1B are illustrations of an embodiment of a surface sediment core catcher 10 comprising, consisting of, or consisting essentially of a cap 12, a cross-beam 14, and a flexible member 16. FIG. 1A is a cross-sectional, side view of the core catcher 10 and FIG. 1B is an end view of the core catcher 10. The cap 12 is configured to be secured to a first end 18 of a core liner 20 such that when the first end 18 of the core liner 20 is inserted into surface sediment a sample sediment core enters the core liner 20 through the cap 12. The cross-beam 14 is coupled to the cap 12 and mounted across the first end 18 of the core liner 20 such that a cross-section of the first end of the core liner 20 is divided into two openings 22. The flexible member 16 is secured to the cross-beam 14 such that the flexible member 16, the cross-beam 14, and the cap 12 form a dual-flap valve. The dual-flap valve is designed to allow a sediment core to enter the core liner 20 through the two openings 22 and to prevent the sediment core from escaping the core liner 22 through the cap 12, such as is shown in FIG. 2E. In a closed configuration, the flexible member 16 seals the two openings 22. In an open configuration, the flexible member 16 flexes into the cap 12 and the core liner 20. The flexible membrane 16 is shown partially-flexed in FIG. 1A.

FIGS. 2A through 2E are a series of cross-sectional, side-view illustrations depicting the core catcher 10 descending into, and being removed from, surface sediment 24. In FIG. 2A, the flexible member 16 is shown in the closed configuration as the core catcher 10 moves toward the surface sediment 24. As the core catcher 10 comes into contact with the surface sediment 24, such as is shown in FIG. 2B, the flexible member 16 flexes and sediment begins to enter the core liner 20. In FIG. 2C, the core catcher 10 has stopped descending and the flexible member 16 is in an open configuration such that the two openings 22 are open. In FIG. 2D, as the core catcher 10 is being removed from the surface sediment 24, the weight of a sediment core 26 within the core liner 20, the pressure difference created by suction as the sediment core 26 is removed from the surface sediment 24, and the elasticity of the flexible member 16 cause the flexible member 16 to move back towards the closed configuration. In FIG. 2E, the core catcher 10 has been removed from the surface sediment 24 with the sediment core 26 held in the core liner 20 by the flexible member 16. In the embodiment of the core catcher 10 shown in FIGS. 2A-2E, the cap 12 and the cross-beam 14 are beveled such that the core catcher 10 also functions as a bit. As the core catcher 10 is inserted into the surface sediment 24 the parts of the core catcher 10 that first come into contact with the surface sediment 24 may be sharpened to provide a beveled, cutting edge to help reduce insertion resistance. The core catcher 10 may be designed to prevent a majority of any liquid that may be in the sediment core 26 from escaping the core liner 20 through the cap 12 once the core catcher 10 is removed from the surface sediment 24. In one embodiment, the flexible member 16 may form a water-tight seal with the cap 12 when in the closed configuration.

Figure 3:
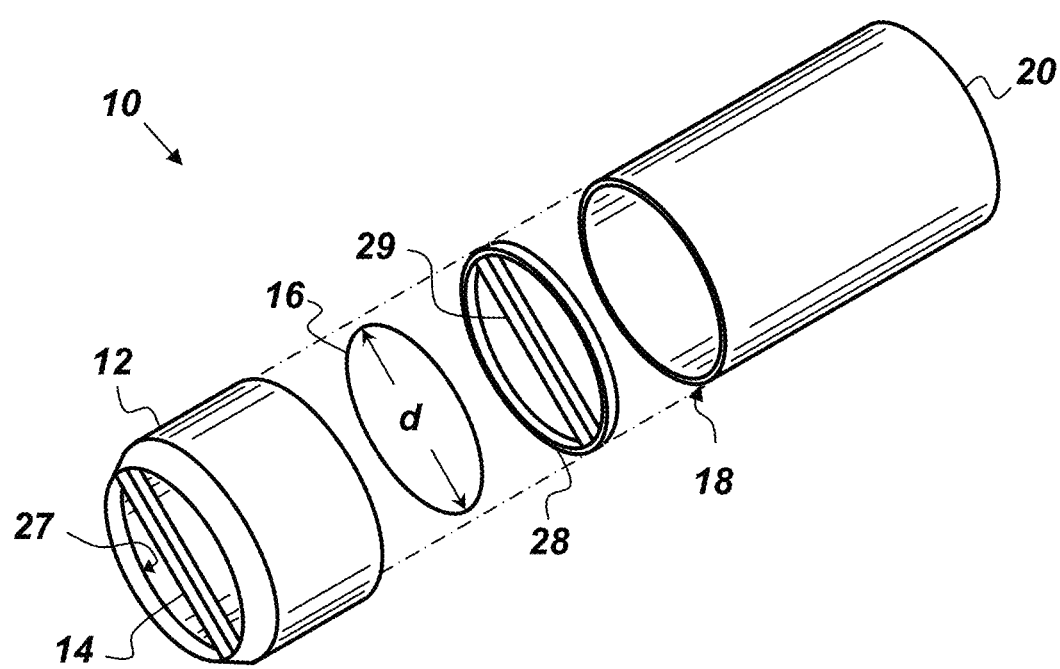
FIG. 3 is an expanded, perspective view of an embodiment of a core catcher.

FIG. 3 is an expanded, perspective view of an embodiment of the core catcher 10. The cap 12 comprises a lip 27 upon which the flexible member 16 rests when in the closed configuration. The flexible member 16 may be held against the cross-beam 14 by an optional retainer 28 that comprises a bar 29. In the embodiment of the core catcher 10 depicted in FIG. 3, the flexible member 16 is disposed between the cross-beam 14 and the bar 29. In one embodiment, the core catcher 10 is constructed of entirely non-metallic parts. For example, in one embodiment, the cap 12, the cross-beam 14, the retainer 28, and the flexible member 16 may all be made of plastic. In another embodiment of the core catcher 10, the flexible member 16 may be made of thin, flexible metal. The flexible member 16 may be made of any material that is flexible enough to perform the function of a dual flap valve. The various parts of the core catcher 10 may optionally be transparent, translucent, or opaque. Different thicknesses and/or material of the flexible member 16 may be chosen to accommodate different types of sediment. The flexible member 16 and the retainer 28 may be designed such that the flexible member 16 may be replaced quickly in the field with a second flexible member having a different modulus of elasticity. The flexible member 16 may be secured to the cross-beam 14 by any desired means. For example, in addition to, or in lieu of, the retainer 28, the flexible member 16 may optionally be screwed, pinned, bolted, and/or glued to cross-beam 14.

Still referring to the embodiment of the core catcher 10 depicted in FIG. 3, the cap 12 is designed to fit securely around the core liner 20. The retainer 28 is designed to fit inside the cap 12 such that the bar 29 secures the flexible member 16 against the cross-beam 14 such that the flexible member 16 is allowed to open when the core catcher 10 is inserted into sediment 24 and then to close as the core catcher 10 is withdrawn from the sediment 24—thereby preventing escape of the sediment core 26 from the core liner 20 through the core catcher 10. The weight of the sediment core 26 causes the flexible member 16 to move into the closed configuration. The retainer 28 may have approximately the same inner and outer diameter as the core liner 20. The absence of a lip on the retainer 28 allows the flexible member 16 to flex upwards, which allows the sediment core 26 to travel into the core liner 20 as the core catcher 10 is inserted into surface sediment 24.

Figure 4:
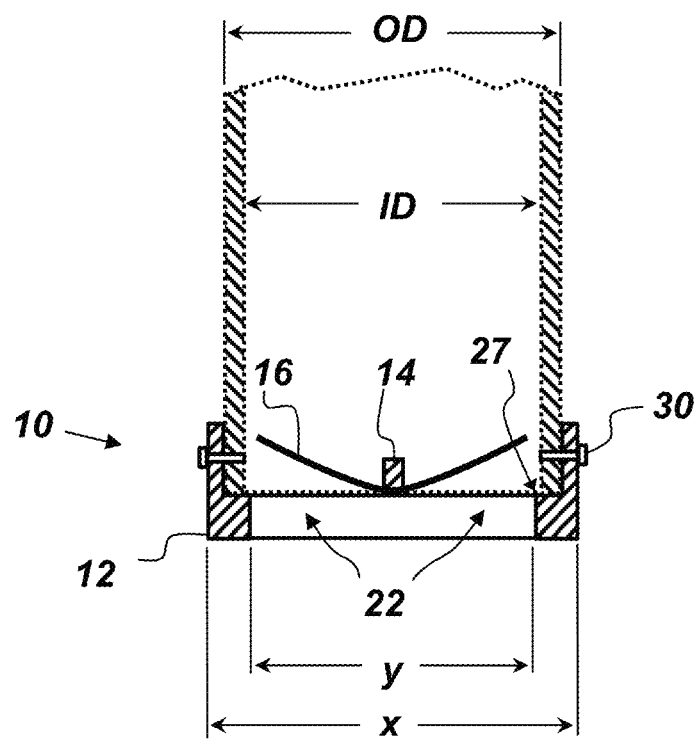
FIG. 4 is a cross-sectional, side view of an embodiment of a core catcher.

FIG. 4 is a cross-sectional view of an embodiment of the core catcher 10 showing a different configuration of the cross-beam 14 and the flexible member 16 than what is shown in FIG. 1A. In this embodiment, the core liner 20 may be notched to accommodate the cross-beam 14. Also shown in FIG. 4 are set screws 30, which may be used to help secure the core catcher 10 to the core liner 20. The core catcher 10 may be secured to the first end 18 of the core liner 20 by any suitable means. Suitable means for securing the core catcher 10 to the core liner 20 include, but are not limited to, compression fit of the cap 12 to the core liner 20, mating screw threads between the first end 18 and the cap 12, adhesives, set screws, and nuts & bolts. While the figures depict the core catcher 10 as having a circular cross-section it is to be understood that the core catcher 10 may have any desired shape, circular or otherwise. Provided below are example dimensions of a circular embodiment of the core catcher 10. The afore-mentioned circular embodiment of the core catcher 10 is designed to attach to a core liner 20 having an outer diameter OD of 7.1 cm and an inner diameter ID of 6.6 cm. In this circular example embodiment, the overall diameter x of the cap 12 is 7.6 cm, the opening diameter y of the cap 12 is 5.9 cm, and the diameter d of the flexible member 16 (shown in FIG. 3) is 6.4 cm.

The core catcher 10 is designed to collect short, intact sediment cores, which may be used for improved ecological risk assessment of contaminated sediment sites without the requirement for manual capping by SCUBA divers. As used herein, a "short" sediment core 26 is defined as having a top to bottom length L (shown in FIG. 2E) of approximately 10 to 15 centimeters (~4 to 6 inches). The core catcher 10 can be affixed to any standard sediment core liner 20 and can retain the majority of the sediment, organisms, and/or liquid in the sediment core 26 with minimal disruption of the vertical stratification of the sediment core 26 once it is removed from the surface sediment 24. The core catcher 10 may be used in conjunction with in situ characterization tools such as in situ bioassays that may include live test organisms and/or passive sampling devices that generally focus on surficial sediment and require recovery of an intact sediment core 26. An intact sediment core 26 is one that is relatively undisturbed (i.e. unmixed) and that preserves the vertical stratification of the sediment core 26. The core catcher 10 is designed to retain in the core liner 20 any benthic organisms that may be present in the sediment core 26. The core liner 20 utilized in in situ characterization tools may be perforated to allow water transport between the sediment core 26 and a surrounding aquatic environment.

Figure 5:
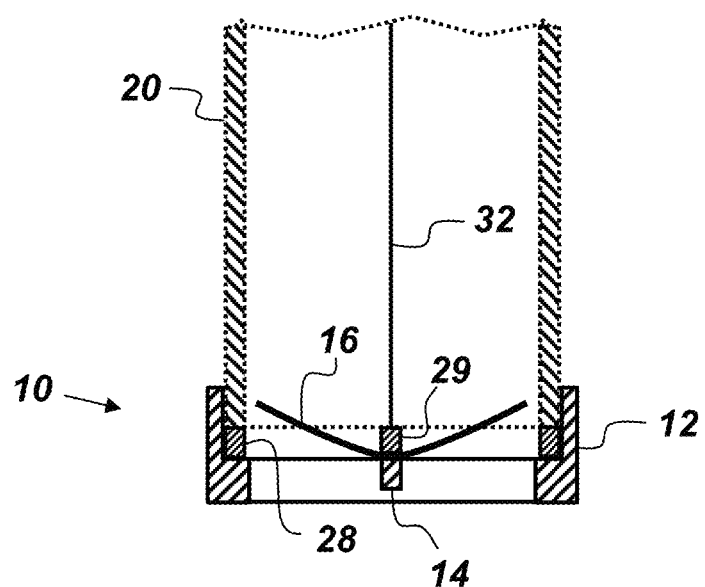
FIG. 5 is a cross-sectional, side view of an embodiment of a core catcher.
Figure 6A:
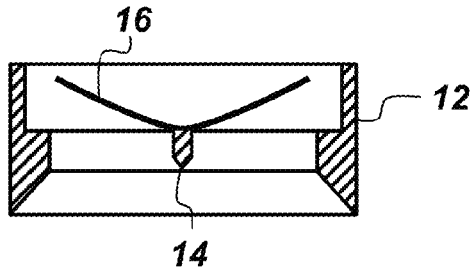
FIGS. 6A through 6E are cross-sectional, side views of various embodiments of a core catcher.
Figure 6B:
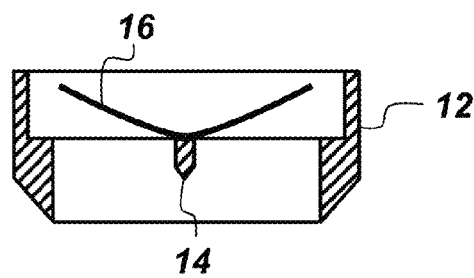
Figure 6C:
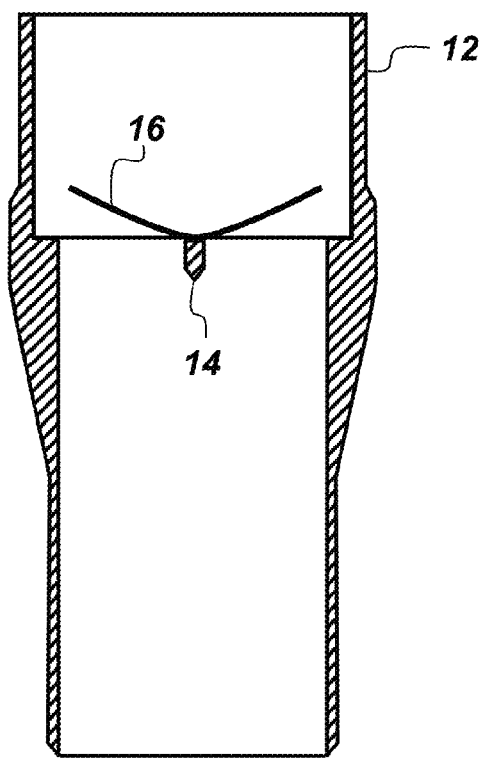
Figure 6D:
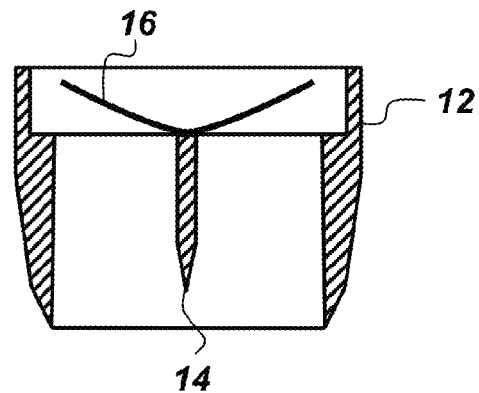
Figure 6E:
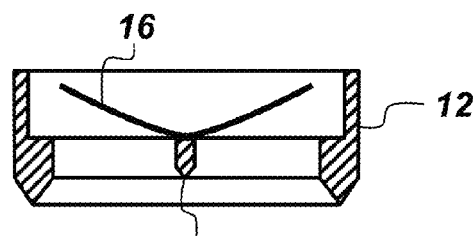

FIG. 5 is a cross-sectional, side view of an embodiment of the core catcher 10 further comprising a divider 32 coupled to the bar 29 of the retainer 29. The divider 32 is designed to fit into the core liner 20 such that the sediment core 26 is divided into two core samples within the core liner 20 for the entire length L of the sediment core 26. For embodiments of the core catcher 10 that do not comprise the retainer 28, the divider 32 may be attached to the cross-beam 14.

FIGS. 6A through 6E are cross-sectional, side views of various embodiments of the core catcher 10. As discussed above, the cap 12 and/or the cross-beam 14 may be beveled to reduce resistance as the core catcher 10 is inserted into the surface sediment 24. Each of FIGS. 6A-6E shows a different bevel design embodiment. It is to be understood that any bevel design, including no bevel, for the cap 12 and/or the cross-beam 14 may be employed with the core catcher 10.

From the above description of the core catcher 10, it is manifest that various techniques may be used for implementing the concepts of the core catcher 10 without departing from the scope of the claims. The described embodiments are to be considered in all respects as illustrative and not restrictive. The apparatus disclosed herein may be practiced in the absence of any element that is not specifically claimed and/or disclosed herein. It should also be understood that the core catcher 10 is not limited to the particular embodiments described herein, but is capable of many embodiments without departing from the scope of the claims.

We claim:

1. A core catcher comprising:
   a cap configured to be secured to a first end of a core liner such that when the first end of the core liner is inserted into sediment a sample sediment core enters the core liner through the cap;
   a cross-beam coupled to the cap and mounted across the first end of the core liner such that a cross-section of the first end of the core liner is divided into two openings;
   a flexible member secured to the cross-beam such that the flexible member, the cross-beam, and the cap form a dual-flap valve designed to allow the sediment core to enter the core liner through the two openings and to prevent the sediment core from escaping the core liner through the cap; and
   a retainer mounted to the cap such that the flexible member is held in place between the retainer and the cross-beam.

2. The core catcher of claim 1, wherein the flexible member is glued to the cross-beam.

3. The core catcher of claim 1, wherein the dual-flap valve is further designed to prevent a majority of any liquid in the sediment core from escaping the core liner through the cap once the core catcher is removed from the sediment.

4. The core catcher of claim 1, wherein the cap, the cross-beam, and the flexible member are all non-metallic.

5. The core catcher of claim 1, wherein the cap has a circular cross-section and the flexible member is disk-shaped.

6. The core catcher of claim 5, wherein the flexible member and the retainer are designed such that the flexible member may be replaced quickly with a second flexible member having a different modulus of elasticity.

7. The core catcher of claim 6, further comprising set screws configured to secure the cap to the core liner.

8. The core catcher of claim 1, wherein the dual-flap valve is watertight.

9. The core catcher of claim 1, wherein the flexible member is translucent.

10. The core catcher of claim 1, wherein an edge of the cap and an edge of the cross-beam are beveled.

11. The core catcher of claim 1, wherein the core catcher is configured to be used to obtain core samples from aquatic surface sediment such that any benthic organisms present in the sediment core are retained in the core liner and vertical stratification of the sediment core is preserved.

12. The core catcher of claim 1, further comprising a core liner divider coupled to the cross-beam and extending the length of the core liner such that the sediment core is divided into two core samples within the core liner.

13. A core catcher comprising:
    a cap configured to be secured to a first end of a core liner such that when the first end of the core liner is inserted into loose ocean sediment a sample sediment core enters the core liner through the cap;
    a cross-beam coupled to the cap and mounted across the first end of the core liner such that a cross-section of the first end of the core liner is divided into two openings;
    a single, nonmetallic, flexible member secured to the cross-beam such that the flexible member, the cross-beam, and the cap form a dual-flap valve designed to allow the sediment core to enter the core liner through the two openings and to prevent the sediment core, any benthic organisms present in the sediment core, and a majority of any liquid in the sediment core from escaping the core liner through the cap; and
    a retainer mounted to the cap such that the flexible member is held in place between the retainer and the cross-beam.

14. The core catcher of claim 13, wherein the cap has a circular cross-section and the flexible member is disk-shaped.

15. The core catcher of claim 14, wherein the flexible member and the retainer are designed such that the flexible member may be replaced quickly with a second flexible member having a different modulus of elasticity.

16. The core catcher of claim 13, wherein the core liner is perforated to allow water exchange between the sediment core and ocean water.

17. The core catcher of claim 13, wherein the flexible member is the only moving part of the core catcher.

18. The core catcher of claim 13, wherein the cap and the cross-beam are plastic.

* * * * *